(12) United States Patent
Paulin et al.

(10) Patent No.: US 6,877,927 B2
(45) Date of Patent: Apr. 12, 2005

(54) SHAFT COUPLER

(75) Inventors: Gregory E. Paulin, Fresno, CA (US); Ross T. Gault, Fresno, CA (US)

(73) Assignee: Weir Floway, Inc., Fresno, CA (US)

( * ) Notice: Subject to any disclaimer, the term of this patent is extended or adjusted under 35 U.S.C. 154(b) by 0 days.

(21) Appl. No.: 10/429,076

(22) Filed: May 2, 2003

(65) Prior Publication Data

US 2004/0218972 A1 Nov. 4, 2004

(51) Int. Cl.[7] .............................................. F16D 1/00
(52) U.S. Cl. ..................... 403/341; 403/293; 403/294; 403/340; 403/356; 403/383; 464/154; 464/182
(58) Field of Search ................................ 403/292–294, 403/331, 333, 339–341, 353–358, 359.1, 403/359.6, 383; 464/153, 154, 179, 182

(56) References Cited

U.S. PATENT DOCUMENTS

| | | | | | |
|---|---|---|---|---|---|
| 711,284 | A | * | 10/1902 | Carey | 403/318 |
| 2,114,127 | A | * | 4/1938 | Neuberth | 403/331 |
| 2,315,414 | A | * | 3/1943 | Germany | 403/331 |
| 3,092,403 | A | * | 6/1963 | Gerdeman | 285/86 |
| 4,416,563 | A | * | 11/1983 | Zemke et al. | 403/14 |

* cited by examiner

Primary Examiner—Daniel P. Stodola
Assistant Examiner—Michael P. Ferguson
(74) Attorney, Agent, or Firm—Donald D. Mon

(57) ABSTRACT

A shaft coupler to connect two coaxial segments of a drive shaft. Each segment includes a tongue, which tongues complement each other to transmit torque and resist axial separation. A bearing surface on each tongue lies within the locking angle of their material so as to resist lateral separation of the segments.

8 Claims, 3 Drawing Sheets

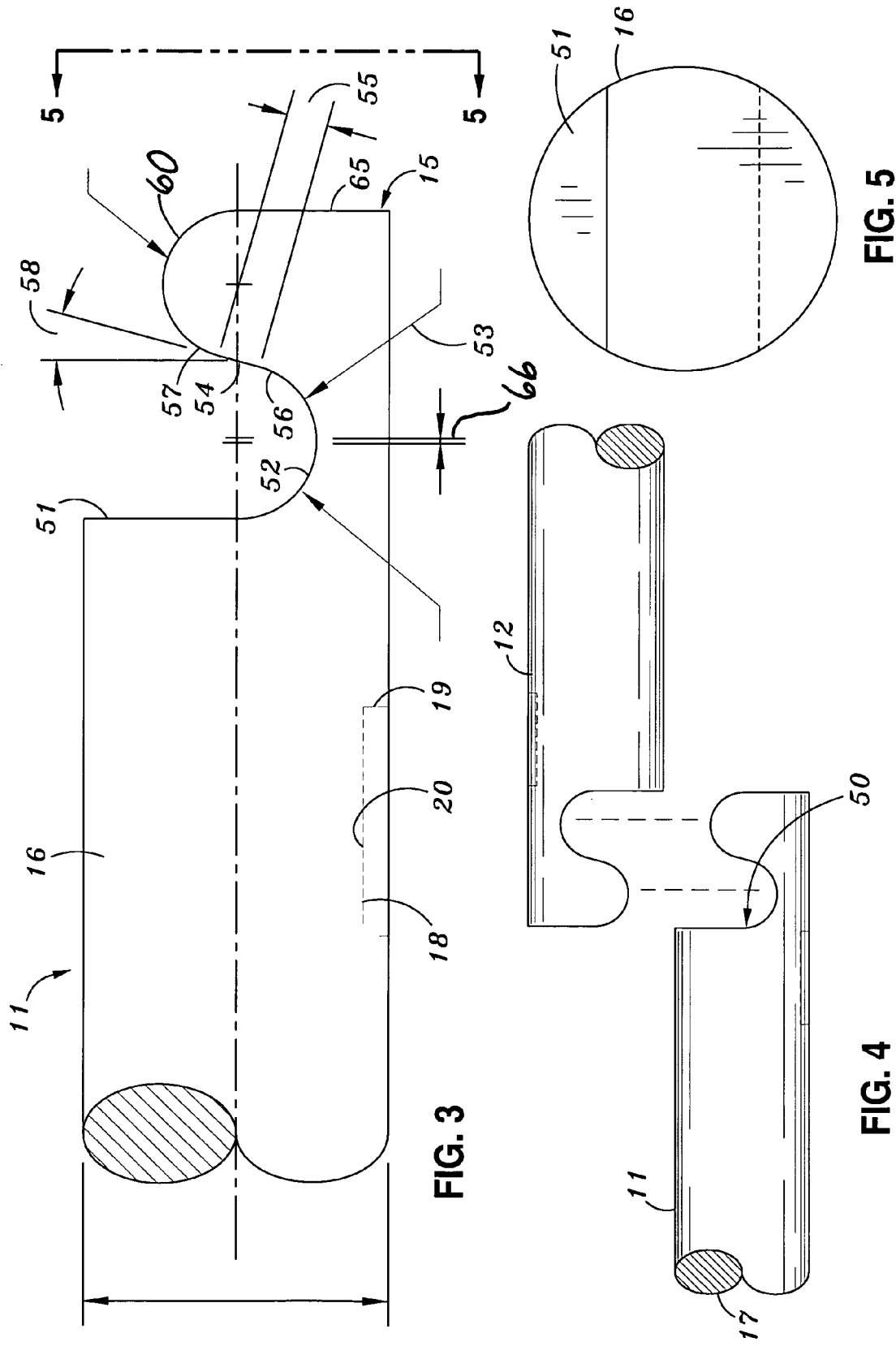

SHAFT COUPLER

FIELD OF THE INVENTION

A coupler to join two segments of a shaft to hold them together for mutual rotation and to resist their axial separation.

BACKGROUND OF THE INVENTION

The joinder of two shaft segments has been the subject of extensive development. The objective is the same in all cases, which is to join two shaft segments so that one can drive the other, and so they can not be pulled apart. The general concept is somehow to hold the segments together by means such as engaging threads, or headed shapes which are somehow engaged. Relative rotational movement of the segments is often attended to by splined engagements.

Despite widespread development, problems continue to arise to be solved. Some of these are the problems of wear, fatigue, and stress concentrations in the shafts, all of which should be minimized or avoided entirely. It is an object of this invention to provide a simply constructed coupler devoid of stress concentration points in the assembly, which tends to be self-centering to a stable position, all in a simple construction.

BRIEF DESCRIPTIONS OF THE INVENTION

This invention is for the coaxial coupling together of a first shaft segment and a second shaft segment, which when joined are drivingly joined. The segments are complementary to each other. Each has a terminal end and a cylindrical peripheral wall contiguous to the terminal end. When joined, the terminal ends interengage, primarily to resist axial separation.

Each peripheral wall includes an axially extending groove into which a respective key is fitted. A coupler sleeve fits over both of the peripheral walls. It includes an axial slot or slots that receives or receive the keys (which project into it or into them), to resist counter-rotation of the segments.

Each terminal end has a transverse receiver recess and a tongue. It has a base wall, a bearing wall and a transition wall interconnecting the base wall and the bearing wall as a smooth curve which is tangent to both of them.

A tongue wall tangent to the bearing wall extends as a smooth curve toward the end of the tongue. The absence of points of stress concentration such as intersections of planar surfaces at an angle to each other, or line contact between surfaces will be noted. Beyond the bearing wall, the shape of the tongue to its end is arbitrary, except when one considers the situation when the axial force is reversed, and the segments are in compressive load with one another. Then the base wall and the terminal wall of the tongue can be formed to make a surface-to-surface contact with one another.

Both bearing walls are flat surfaces which are disposed at equal angles to the central axis. According to a preferred but optional feature of the invention, this angle is within the locking range of the materials and surfaces of which the tongue is formed.

The above and other features of this invention will be fully understood from the following detailed description and the accompanying drawings, in which:

BRIEF DESCRIPTION OF THE DRAWINGS

FIG. 3 is a side view of one of the segments;

FIG. 4 is an exploded view of FIG. 3;

FIG. 5 is a right hand view taken at line 5—5 in FIG. 3;

DETAILED DESCRIPTION OF THE INVENTION

Figure 1:
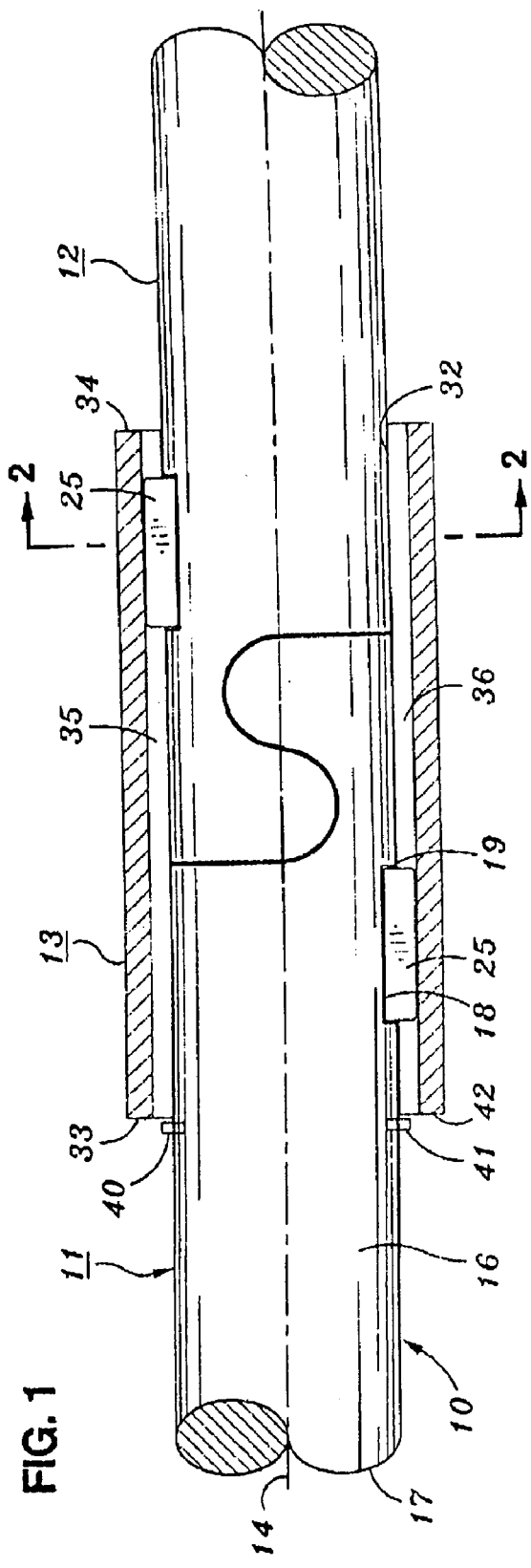
FIG. 1 is an axial view partly in cross-section, showing the presently preferred embodiment of the invention.
Figure 2:
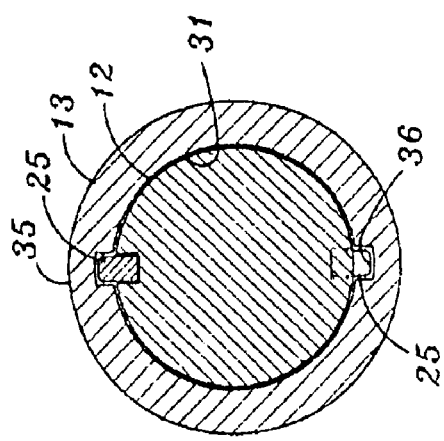
FIG. 2 is a cross-section taken at line 2—2 in FIG. 1.

A coupled shaft 10 according to this invention is shown in FIG. 1. It includes a first shaft segment 11, a second shaft segment 12 and a sleeve 13. The segments when assembled are concentric on a central axis 14. The coupling is intended to resist axial separation along the central axis, and to provide for rotation around the central axis.

A common use for this assembly is when the first shaft segment is the output shaft from a motor, and the second shaft segment is the drive shaft for a turbine rotor. In one example, a separative force of about 4,000 pounds is resisted. While the shafts are supported by adequate bearings, torque loads can vary, and oscillating forces can exist. It is much to be preferred for the coupling to provide substantial bearing areas to transmit axial forces, to resist lateral movement between the terminal ends of the shaft segments, and to provide structure which tends to maintain a specific rotational relationship between the segments. All of this is accomplished by this invention.

Shaft segments 11 and 12 are identical in all pertinent features, so only shaft segment 11 will be described in detail. It includes a terminal end 15 and a cylindrical peripheral wall 16. End 17 may be considered to be either the driven or driving end of the coupled assembly.

An axially extending groove 18 is formed in wall 16. It has a depth 19 and a dimension of width 20. This groove will accept in close fitting relationship a key 25 with a width about equal to the width of the groove, and a height greater than the depth of the groove so it will project radially above the peripheral wall.

Sleeve 13 has an internal cylindrical wall 31 to form a passage 32 from end 33 to end 34 of the sleeve. Axially extending slots 35 and 36 are formed in wall 31 each with a width about equal to the width of the key. The diameter of the passage is about equal to the outer diameter of peripheral wall 16. Accordingly, the sleeve, the segments, and the keys, make a good fit with each other to restrain the segments against counter rotation. It will be noted that when the identical segments are assembled, the keys will be on opposite sides of the assembly. For this reason two slots are formed, 180 degrees apart. Should only one slot be desired, then the groove in one of the segments must be on its opposite side.

It is most convenient for slots 35 and 36 to open at both ends of the sleeve. Then the sleeve is reversible and available for all assortments of shafts and from both ends. However, for any specific arrangement, opening at only one end is acceptable if assembly from only one end is acceptable. Also, more than two slots may be used, perhaps with shorter keys if desired to reduce the load on the individual keys.

Restraint 40 comprises a ring groove 41 formed in the outer peripheral wall, and a snap ring 42 in this groove that will hold the sleeve against axial retraction.

The terminal end of the shafts is the critical part of this invention. It is formed in a complementary manner so that the same structures on both segments will engage one another. By "complementary" is meant surface-to-surface contact of similarly shaped surfaces.

The terminal end begins with a transverse receiver recess 50. It starts with a base wall 51 that extends across the central axis, preferably as developed by a straight surface generator that is maintained normal to the center axis. It terminates at a curved transition wall 52 which is tangent to it. It has a radius 53 which generates a smooth transition to a bearing wall 54, to which it is tangent. The reader will recognize the smooth transition from the base wall into the bearing wall. There will be no abruptly singular line contact with a next surface.

Bearing wall 54 is a flat planar surface having a substantial area between its edges 56 and 57, which are spaced by a dimension 55. It is disposed at an angle 58, which is of significant importance to this invention.

A tongue wall 60 is a curved structure generated by a straight line generator that is preferably tangent to the bearing surface at edge 57, and which extends toward the free end of the segment. It need not reach the very end of the segment.

The principal resistance to axial separation of the segments is the mutual contact of the bearing walls. These involve substantial areas of full contact at angle 58. Obviously if this angle is too great, there will be a lateral separation force component tending to cause lateral movement between the terminal ends. This can exert an enlarging expansive force on the sleeve.

However, if angle 58 is kept within the locking range of the materials of construction, the more forceful the axial separation forces, the stronger will be the resistance to lateral separation. This is the consequence of the classical relationship between the coefficient of friction, the angle, and the applied forces.

Speaking generally, for bearing surfaces such as would be used in steels, an angle of about 15 degrees or less would be well within the "locking range". Useful dimensions for bearing wall 54 for a steel segment are about ⅛ inch by 1 7/16 inches, with angle 58 about 15 degrees. This readily attends to axial loads of well over 4,000 pounds.

With the above in mind, the reader may advantageously study FIGS. 1–4, and notice that no twist or pull can develop a localized stress concentration. All surfaces smoothly fair into one another. There is no line contact which could create a local region of high stress.

There is an additional advantage to this construction. When the two planar bearing surfaces are rotationally aligned and brought together, they will establish the rotational positions of the segments as well as their axial location. Any rotational movement from that central orientation would require an axial displacement of the shafts relative to one another. The tendency of the shafts when brought toward one another is to minimize their separation. Then when brought together, counter rotation requires axial respective movement. But this is opposed by the keys, and by the separation force exerted by the user device. In one situation the separation force will be generated by the turbine wheel.

In addition, the keys resist counter rotation. In every situation any tendency toward counter rotation is doubly resisted. When that force is removed, such as when the system is shut down, forces during re-start are all channeled toward the stable situation shown.

The shape of terminal end 15 from edge 57 of the bearing wall is of lesser importance, because, with proper design it will resist separative forces, and will not bend so as to pull the bearing surface in an axial direction. Preferably it will be designed as shown with a substantial body that resists deformation.

Another feature of this construction is abutment surface 65 at the free end 15. It preferably includes a substantial area that is flat and normal to the central axis. FIG. 3 schematically shows a dimension 66 that is the consequence of manufacturing tolerances. It is the amount of relative axial movement of these segments between when they are forced apart and when they move together. The first is when a turbine wheel shows, idles, or stops.

When it stops, the segments abut at surfaces 51 and 65. This is a solid contact.

Figure 6:
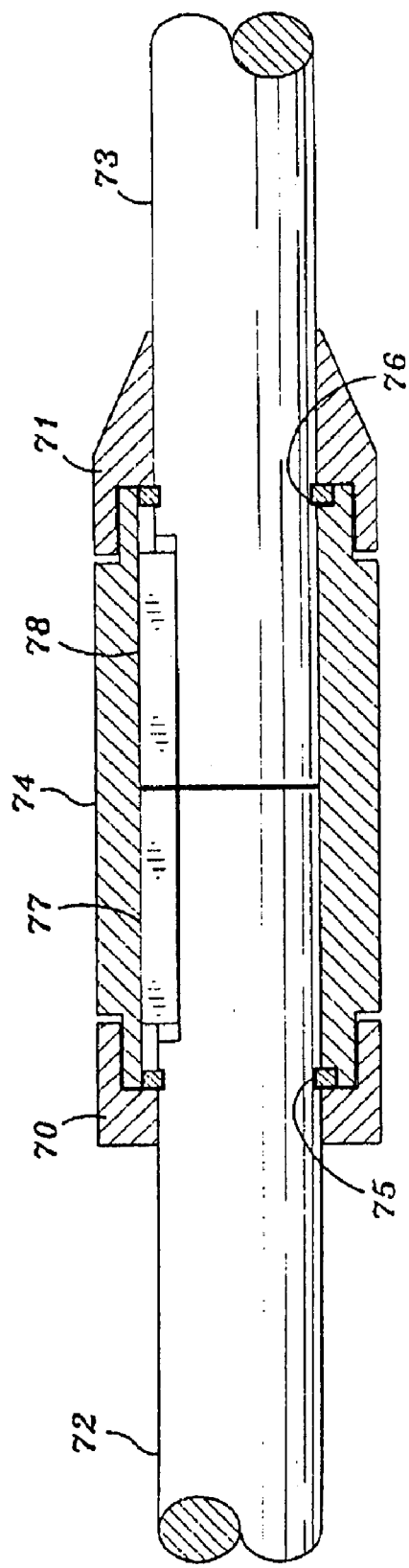
FIG. 6 is an axial view partly in cross-section, showing a prior art coupler.
Figure 7:
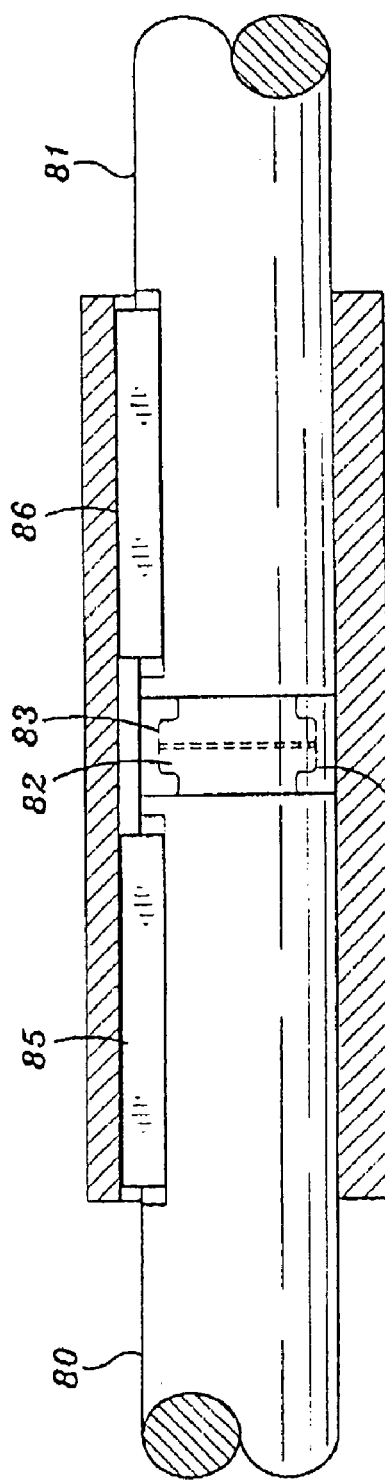
FIG. 7 is a view similar to FIG. 6, showing another prior art coupler.

FIGS. 6 and 7 show previous efforts to form a stable coupling. In FIG. 6 two end caps 70, 71 are threaded onto shaft segment 72, 73 to hold a sleeve 74 to them through rings 75, 76. Keys 77, 78 are keyed to the sleeve.

FIG. 7 shows segments 80, 81 with heads 82, 83 held together by a clip 84. Keys 85, 86 hold the segments to the sleeves.

FIGS. 6 and 7, the parts are more numerous, the shapes more complicated and stressed, and the assemblies are less reliable.

This invention is not to be limited by the embodiment shown in the drawings and described in the description, which is given by way of example and not of limitation, but only in accordance with the scope of the appended claims.

What is claimed is:

1. In a coupled shaft comprising a first and a second shaft segment which when coaxially assembled have a common central axis, said coupled shaft being transmissive of torque exerted by one of them, and resistive to axial separation in response to an axial separative force exerted on them, each said segment comprising a metal body having a terminal end, and adjacent to said terminal end a cylindrical peripheral wall coaxial with said central axis, an apparatus comprising:

a coupler sleeve comprising a metal body having an internal cylindrical wall forming a passage therethrough, said internal wall so proportioned and arranged as to embrace said cylindrical peripheral wall of both of said shaft segments, and a first and a second end, and a longitudinally extending slot in said internal cylindrical wall, opening on at least one end of said sleeve, said slot having a dimension of width;

an axially-extending groove in said peripheral wall of each shaft segment, said groove having a pair of axially extending, radially spaced apart side walls, spaced apart by a reference spacing and a dimension of depth;

a rigid key fitted in each of said grooves having opposite sides laterally spaced apart to closely fit in a respective said groove and also in said slot in said sleeve, and a thickness greater than said dimension of depth whereby to project radially beyond its respective peripheral side wall into said slot;

each said terminal end formed to complementarily engage the other terminal end to resist their axial separation from one another, each said terminal end including a transverse receiver recess and a tongue, said recess having a base wall extending across said central axis, a planar bearing wall which is neither parallel to or normal to the central axis, at an angle to said axis, a transition wall interconnecting said base wall and bearing wall as a smooth curve tangent to said bearing wall and base wall, said bearing walls being formed at the same said angle relative to the central axis, and which said angle is within the locking range of the material and its surfaces of which the bearing walls are made;

a tongue wall contiguous to said bearing wall and extending toward the end of the tongue;

whereby, when assembled together with the tongues in the recesses, the planar bearing walls can be brought together in sufficient surface contact, thereby resisting relative shear movement between them when an axial separative force is exerted on the completed shaft preventing axial separation of the segments, placement of the sleeve over the segments and keys preventing substantial relative rotation of the segments.

2. Apparatus according to claim 1 in which said tongue wall terminates in an end wall so disposed relative to its bearing wall that, when said segments are joined but pressed together, one of said end walls bears against one of said base walls to support said segments in axial compression.

3. Apparatus according to claim 2 in which said base wall and the terminal end of said end wall are planar and normal to said axis.

4. Apparatus according to claim 2 in which said end wall is tangent to said bearing wall.

5. Apparatus according to claim 1 in which a restraint is attached to one of said segments to limit the movement of the sleeve beyond a defined limit.

6. Apparatus according to claim 1 in which said slot is open at both ends of the sleeve.

7. Apparatus according to claim 1 in which said key has a lateral cross-section which is substantially rectangular.

8. Apparatus according to claim 1 in which a pair of said slots is formed in said internal cylindrical wall to receive a respective one of said keys, said slots being disposed 180 degrees apart.

* * * * *